(12) United States Patent
Choi et al.

(10) Patent No.: US 8,469,637 B2
(45) Date of Patent: Jun. 25, 2013

(54) CUTTING INSERT HAVING NON-SYMMETRICAL BACK SIDE FACE PORTION AND CUTTING TOOL COMPRISING THE SAME

(75) Inventors: Chang Hee Choi, Daegu (KR); Chang Gyu Park, Daegu (KR); Hee-Seok Kim, Daegu (KR)

(73) Assignee: TaeguTec, Ltd., Dalsung-gun, Daegu (KR)

( * ) Notice: Subject to any disclaimer, the term of this patent is extended or adjusted under 35 U.S.C. 154(b) by 200 days.

(21) Appl. No.: 13/214,628

(22) Filed: Aug. 22, 2011

(65) Prior Publication Data

US 2011/0299945 A1  Dec. 8, 2011

Related U.S. Application Data

(63) Continuation-in-part of application No. PCT/KR2009/001212, filed on Mar. 11, 2009.

(30) Foreign Application Priority Data

Feb. 23, 2009  (KR) .................. 10-2009-0014933

(51) Int. Cl.
*B23C 5/10* (2006.01)
*B23C 5/20* (2006.01)

(52) U.S. Cl.
USPC .......................... 407/103; 407/113

(58) Field of Classification Search
USPC ................. 407/113, 114, 115, 116, 103
See application file for complete search history.

(56) References Cited

U.S. PATENT DOCUMENTS

| 4,251,172 | A | * | 2/1981 | Durand .................. 408/228 |
| 4,355,932 | A | | 10/1982 | Koppelmann et al. |
| 4,984,943 | A | * | 1/1991 | Hamilton ................ 408/144 |
| D324,690 | S | * | 3/1992 | Takahashi et al. ........... D15/139 |
| 5,209,611 | A | * | 5/1993 | Drescher ................ 407/48 |
| 5,580,194 | A | * | 12/1996 | Satran et al. .............. 407/40 |
| 5,632,576 | A | * | 5/1997 | Storch ................... 407/32 |

(Continued)

FOREIGN PATENT DOCUMENTS

| CN | 201061833 Y | 5/2008 |
| DE | 2653302 A1 | 10/1978 |

(Continued)

OTHER PUBLICATIONS

International Search Report in PCT/KR2009/001212, dated Mar. 9, 2010.

(Continued)

*Primary Examiner* — Will Fridie, Jr.
(74) *Attorney, Agent, or Firm* — Womble Carlyle

(57) ABSTRACT

A cutting insert has an upper face and a lower face; a front side face portion and a back side face portion, the front and back side face portions connecting the upper face and the lower face; and a through-hole passing through the upper face and the lower face. A cutting edge is formed in the front side face portion, and the back side face portion is provided with a first inclined face and a second inclined face which are inclined forwardly at different angles, respectively, with respect to a plane normal to a rotational axis. The first inclined face is longer than the second inclined face so that the back side face portion has a non-symmetrical convex "V" shape.

25 Claims, 4 Drawing Sheets

U.S. PATENT DOCUMENTS

| | | | |
|---|---|---|---|
| 5,704,737 A | * | 1/1998 | Alford .................. 407/114 |
| 5,772,364 A | * | 6/1998 | Satran et al. ............ 407/42 |
| 6,071,045 A | | 6/2000 | Janness |
| 6,158,927 A | * | 12/2000 | Cole et al. .............. 407/48 |
| 6,648,560 B2 | * | 11/2003 | Andras ................. 407/109 |
| 7,044,695 B2 | * | 5/2006 | Stojanovski ............ 409/234 |
| 7,520,700 B2 | * | 4/2009 | Johansson et al. ........ 407/114 |
| 7,905,688 B2 | * | 3/2011 | Ertl et al. ............... 407/42 |

FOREIGN PATENT DOCUMENTS

| | | |
|---|---|---|
| FR | 2867708 A1 | 9/2005 |
| JP | 2002-066828 A | 3/2002 |
| KR | 10-2000-0061033 A | 10/2000 |
| KR | 10-2006-0054916 A | 5/2006 |
| WO | WO 2005/089993 | 9/2005 |

OTHER PUBLICATIONS

Written Opinion in PCT/KR2009/001212, dated Mar. 9, 2010.
Official Action dated Nov. 23, 2012 issued in Chinese counterpart application (No. 200980157398.7).
Search Report dated Nov. 23, 2012 issued in Chinese counterpart application (No. 200980157398.7).
Official Action dated Jan. 31, 2013 issued in Japanese counterpart application (No. 2011-547743).

* cited by examiner

CUTTING INSERT HAVING NON-SYMMETRICAL BACK SIDE FACE PORTION AND CUTTING TOOL COMPRISING THE SAME

RELATED APPLICATIONS

This is a Continuation-in-part of International Application No. PCT/KR2009/001212, filed 11 Mar. 2009 and published as WO 2010/095775A1 on 26 Aug. 2010, which claims priority to KR 10-2009-0014933, filed 23 Feb. 2009. The contents of the above-identified applications are incorporated by reference in their entirety.

FIELD OF THE INVENTION

The present invention relates to a cutting insert and a cutting tool comprising the same, and more particularly, to a cutting insert and a cutting tool comprising the same, in which a back side face portion of the cutting insert is formed in a non-symmetric "V" shape for dispersion of a force applied to a clamp screw, thereby preventing damage to the clamp screw and firmly clamping the cutting insert to a holder.

BACKGROUND

In general, a cutting tool includes a holder made of steel and a cutting insert made of cemented carbide steel and the cutting insert is indexably mounted to the holder through a clamp screw.

Such an indexable cutting tool is advantageous in that the cutting insert thereof can be replaced with a new one if a cutting edge of the cutting insert is worn out. However, when coupling between the cutting insert and the holder is defective, problems such as separation of the cutting insert and damage of the clamp screw may occur.

In the mean time, the cutting insert is mounted to a tool body, with a back cross-section thereof being perpendicular to a rotational axis thereof. In this structure, a longitudinal resistance can be supported stably, but a reaction force with respect to a lateral cutting resistance is offset only by a clamping force of the clamp screw which fixes the cutting insert to the tool body.

During processing of a work-piece in a high-feed condition, a large cutting resistance acts in a cutting edge of the cutting insert and thus a sufficient clamping force for the cutting resistance cannot be provided merely by the clamp screw. In this condition, the clamp screw may be damaged.

The present invention is conceived to solve the aforementioned problems, an object of the present invention is to provide a cutting insert and a cutting tool comprising the same, in which a back side face portion of the cutting insert is formed in a non-symmetrical convex "V" shape for dispersion of a force applied to a clamp screw, thereby preventing damage of the clamp screw and firmly clamping the cutting insert to a holder.

In addition, another object of the present invention is to provide a cutting insert and a cutting tool comprising the same, in which the cutting insert is capable of reducing manufacturing tolerance by providing easiness in manufacturing and has superior mounting precision.

According to an aspect of the present invention for achieving the objects, there is provided a cutting tool, which comprises an upper face and a lower face; a front side face portion and a back side face portion, the front and back side face portions connecting the upper face and the lower face; and a through-hole passing through the upper face and the lower face, wherein a cutting edge is formed in the front side face portion, and the back side face portion is provided with a first inclined face and a second inclined face which are inclined forwardly at different angles, respectively, with respect to a plane normal to a rotational axis, and the first inclined face is longer than the second inclined face so that the back side face portion has a non-symmetrical convex "V" shape.

According to another aspect of the present invention for achieving the objects, there is provided a cutting tool, which comprises a holder having a pocket formed on a front end portion thereof, the pocket having a pair of jaws; and a cutting insert indexably mounted to the pocket, wherein the cutting insert comprises a upper face and a lower face corresponding to each of jaws, respectively, a front side face portion and a back side face portion corresponding to the pocket of the holder, the front and back side face portions connecting the upper face and the lower face, and a through-hole passing through the upper face and the lower face, a cutting edge is formed in the front side face portion, the back side face portion is provided with a first inclined face and a second inclined face which are inclined forwardly at different angles, respectively, with respect to a plane normal to a rotational axis, and the first inclined face is longer than the second inclined face so that the back side face portion has a non-symmetrical convex "V" shape.

As described above, the cutting insert and the cutting tool comprising the same according to the present invention provide a stable supporting structure with respect to an axial direction, and prevent damage of the clamp screw and firmly clamp the cutting insert to the holder by dispersing a force applied to the clamp screw.

In addition, the cutting insert and the cutting tool comprising the same according to the present invention are easy to manufacture due to a large manufacturing tolerance and have superior mounting precision.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION

Figure 1:
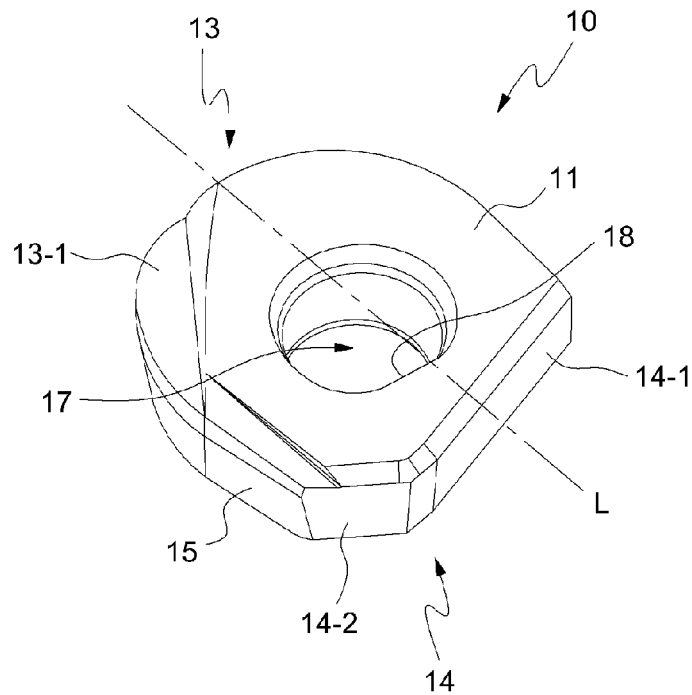
FIG. 1 is a perspective view of a cutting insert according to a first embodiment of the present invention.

Hereinafter, the cutting insert according to the preferred embodiment of the present invention will be described in more detail with reference to the accompanying drawings. In the drawings, similar symbols typically identify similar components, unless context dictates otherwise. The drawings are provided for simplicity of description, and shapes of structural members may be exaggerated or reduced for clarity.

Figure 2:
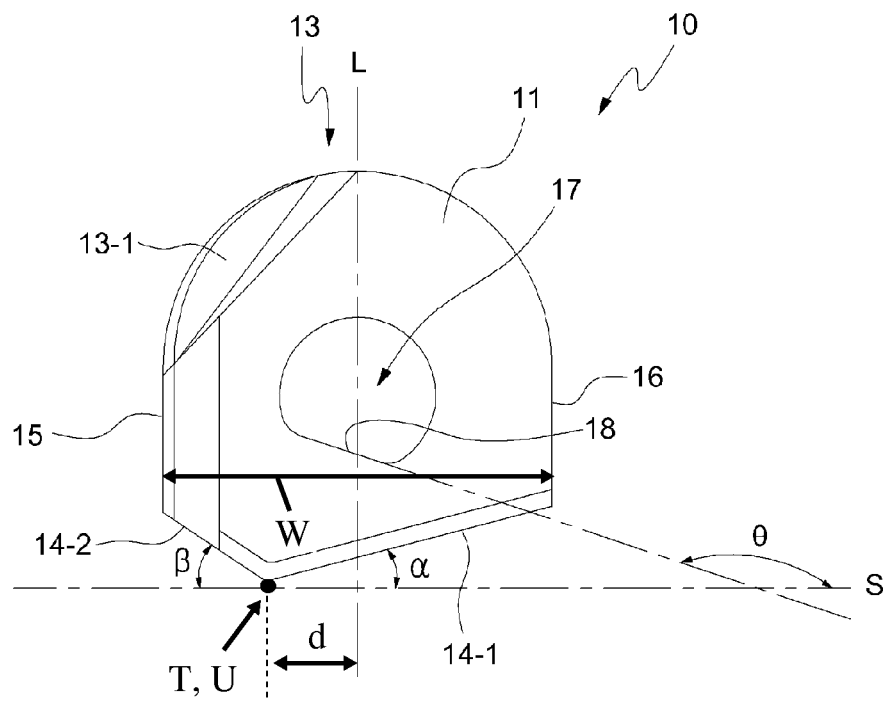
FIG. 2 is a front view of the cutting insert illustrated in FIG. 1.
Figure 3:
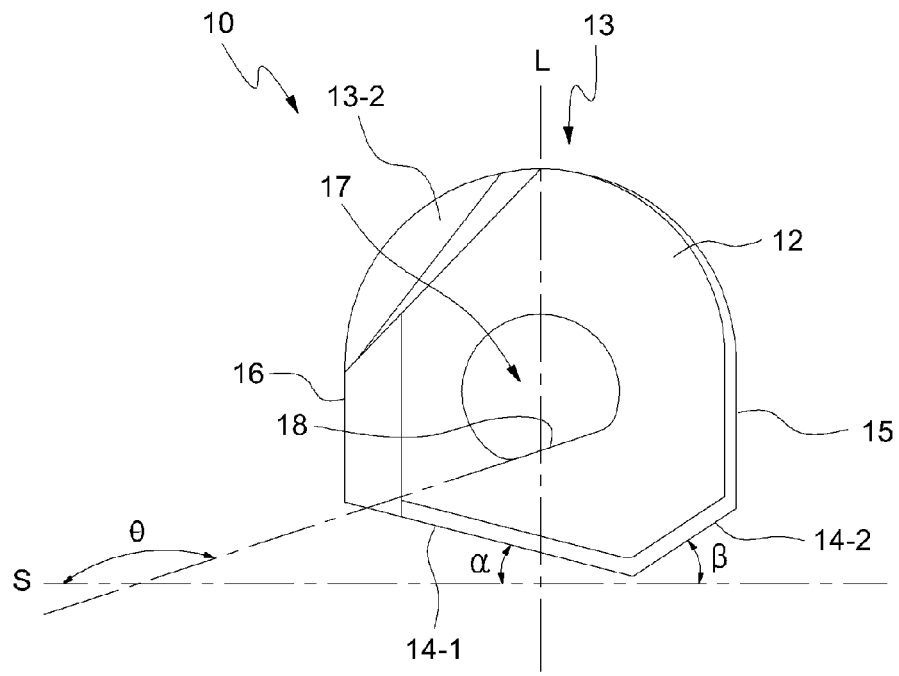
FIG. 3 is a rear view of the cutting insert illustrated in FIG. 2.

FIG. 1 is a perspective view of a cutting insert 10 according to a first embodiment of the present invention, FIG. 2 is a front view of the cutting insert 10 illustrated in FIG. 1, and FIG. 3 is a rear view of the cutting insert 10 illustrated in FIG. 2.

The cutting insert 10 according to the first embodiment of the present invention comprises a upper face 11, a lower face 12, and a front side face portion 13 corresponding to a workpiece (not shown) and a back side face portion 14 corresponding to a pocket of a holder (not shown), the front and back side face portions 13 and 14 connecting the upper face 11 and the lower face 12, and a through-hole 17 passing through the upper face 11 and the lower face 12.

Here, the front side face portion 13 is provided with a pair of cutting edges 13-1 and 13-2 which are rotationally symmetric to the rotational axis L.

In addition, the front side face portion 13 of the cutting insert 10 may also comprise connection sides 15 and 16 which are parallel to the rotational axis L.

The back side face portion 14 has a first inclined face 14-1 and a second inclined face 14-2 which are formed upward from a plane S normal to the rotational axis L at predetermined inclination angles α and β, respectively. The first inclined face 14-1 is longer than the second inclined face 14-2. That is, the first inclined face 14-1 and the second inclined face 14-2 may form a non-symmetrical convex "V" shape.

In some embodiments, the first inclined face 14-1 is at least one-and-half times as long as the second inclined face 14-2. In some embodiments, the first inclined face 14-1 and the second inclined face 14-2 together extend across substantially the entire width W of the back side face portion 14.

Here, the inclination angle α of the first inclined face 14-1 of the back side face portion 14 may be smaller than the inclination angle β of the second inclined face 14-2, where the first inclined face 14-1 may be inclined at the inclination angle α of 5°-15° with respect to the plane S perpendicular to the rotational axis L and the second inclined face 14-2 may be inclined at the inclination angle β of 35°-45° with respect to the plane S which is perpendicular to the rotational axis L.

As best seen in the front view of the cutting insert which shows the upper surface (see FIG. 2), the plane S contains the backmost portion T of the cutting insert 10. In addition, the first inclined face 14-1 and the second inclined face 14-2 converge in a rearward direction of the cutting insert 10 to a convergence point U which is spaced apart from the rotational axis L by a non-zero distance d in a direction perpendicular to the rotational axis L. The distance d may in some cases be about 25% of the entire width W of the back side face portion 14. In the shown embodiment, the backmost portion T of the cutting insert and the convergence point U are co-located, though this is not a requirement. Thus, either or both the backmost portion T and the convergence point U may be spaced apart from the rotational axis L. In addition, the at least one cutting edge 13-1 is substantially on the same side of the axis of rotation L as the second inclined face 14-2.

In the mean time, a portion of an inner circumferential surface of the through-hole 17 may be a flat plane 18 inclined in an opposite direction to the first inclined face 14-1.

An angle θ of the flat plane 18 is an obtuse angle formed by an extending line of the flat plane 18, viewed from the upper face 11 of the cutting insert 10 (see FIGS. 2 and 3), with respect to the plane S perpendicular to the rotational axis L.

The cutting insert 10 structured as described above provides superior engagement precision when being engaged with a holder and remains stably mounted against the axial and radial cutting resistances.

Figure 4:
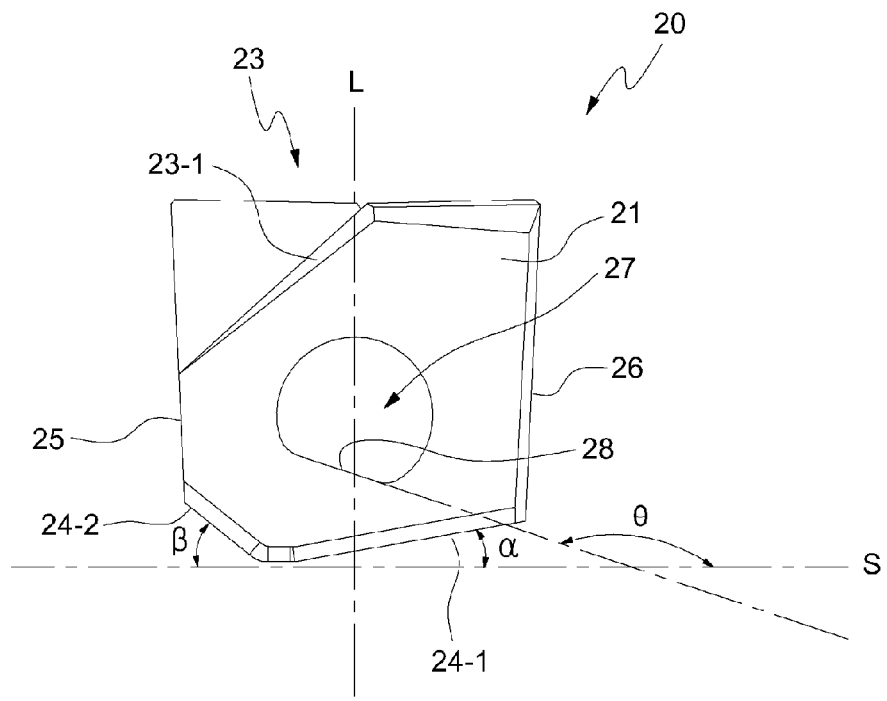
FIG. 4 is a front view of a cutting insert according to a second embodiment of the present invention.

FIG. 4 is a front view of a cutting insert 20 according to a second embodiment of the present invention. The cutting insert 20 according to the second embodiment of the present invention includes a upper face 21, a lower face (not shown), and a front side face portion 23 and a back side face portion 24, the front and back side face portions connecting the upper face 21 and the lower face, and a through-hole 27 passing through the upper face 21 and the lower face.

Here, the front side face portion 23 has a pair of cutting edges 23-1 and 23-2 having a structure which are rotationally symmetric to the rotational axis L.

Except for a difference in shape between the cutting edge 13-1 of the cutting insert 10 according to the first embodiment of the present invention and the cutting edge 23-1 of the cutting insert 20 according to the second embodiment of the present invention, structures and shapes of other components of the cutting insert 20 are the same as those of the cutting insert 10.

In other words, the cutting insert 10 according to the first embodiment of the present invention is a ball endmill and the cutting insert 20 according to the second embodiment of the present invention is a corner-radius (R) endmill.

The front side face portion 23 of the cutting insert 20 may also comprise connection sides 25 and 26 which are parallel to the rotational axis L.

The back side face portion 24 has a first inclined face 24-1 and a second inclined face 24-2 which are formed upward from a plane S perpendicular to the rotational axis L at predetermined inclination angles α and β, respectively. The length of the first inclined face 24-1 is larger than that of the second inclined face 24-2.

That is, the first inclined face 24-1 and the second inclined face 24-2 may form a non-symmetrical convex "V" shape.

Here, the inclination angle α of the first inclined face 24-1 of the back side face portion 24 may be smaller than the inclination angle β of the second inclined face 24-2, where the first inclined face 24-1 may be inclined at the inclination angle α of 5°-15° with respect to the plane S perpendicular to the rotational axis L and the second inclined face 24-2 may be inclined at the inclination angle β of 35°-45° with respect to the plane S perpendicular to the rotational axis L.

A portion of an inner circumferential surface of the through-hole 27 may be a flat plane 28 inclined in an opposite direction to the first inclined face 24-1.

For example, an angle θ of the flat plane 28 is an obtuse angle formed by an extending line of the flat plane 28, viewed from the upper face 21 of the cutting insert 20, with respect to the plane S perpendicular to the rotational axis L.

Figure 5:
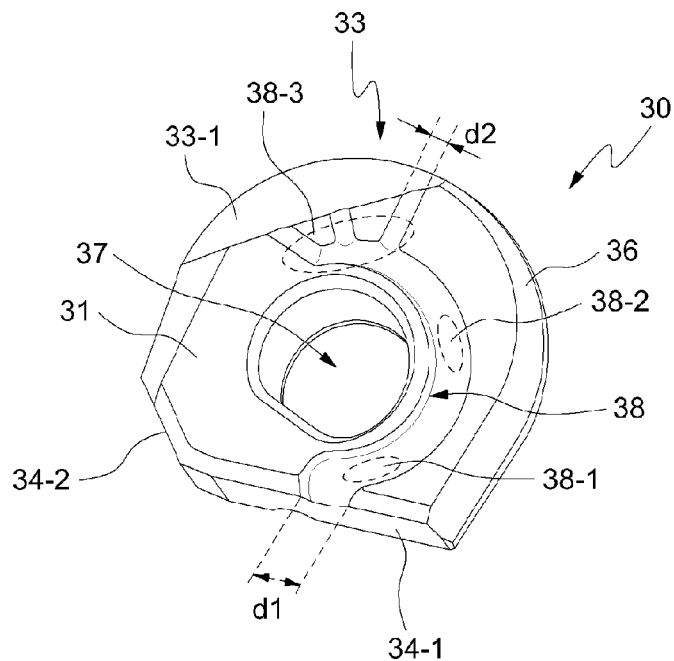
FIG. 5 is a front view of a cutting insert according to a third embodiment of the present invention.

FIG. 5 is a perspective view of a cutting insert 30 according to a third embodiment of the present invention. The cutting insert 30 according to the third embodiment of the present invention has the same structure and shape as those of the cutting insert 10 according to the first embodiment of the present invention or the cutting insert 20 according to the second embodiment of the present invention, and may further comprise a recess 38 in at least one of both a upper face 31 and a lower face (not shown) in order to supply a coolant.

Both ends of the recess 38 are opened, for example, an inlet portion 38-1 of the recess 38 may be formed in a boundary portion between a first inclined face 34-1 and the upper face 31, a outlet portion 38-3 of the recess 38 may be formed in a boundary portion between a cutting edge 33-1 and the upper face 31, and an intermediate portion 38-2 connecting the inlet portion 38-1 and the outlet portion 38-2 may be formed around a through-hole 37.

The recess 38 may also be formed in both the upper face 31 and the lower face (not shown) in a shape rotationally symmetric with respect to the rotational axis L.

In the mean time, it is preferable that a cross-section area of recess 38 is gradually reduced from an inlet portion 38-1(d1: a cross-section area of the inlet portion) toward an outlet portion 38-3(d2: a cross-section area of the outlet portion). Thus, the recess 38 is in the shape of a nozzle toward the cutting edge 33-1, thereby increasing the flow rate of a coolant (cutting oil or air) and effectively injecting the coolant.

With reference to the accompanying drawings, a detailed description will now be made of a cutting tool comprising the cutting inserts 10, 20, and 30.

Figure 6:
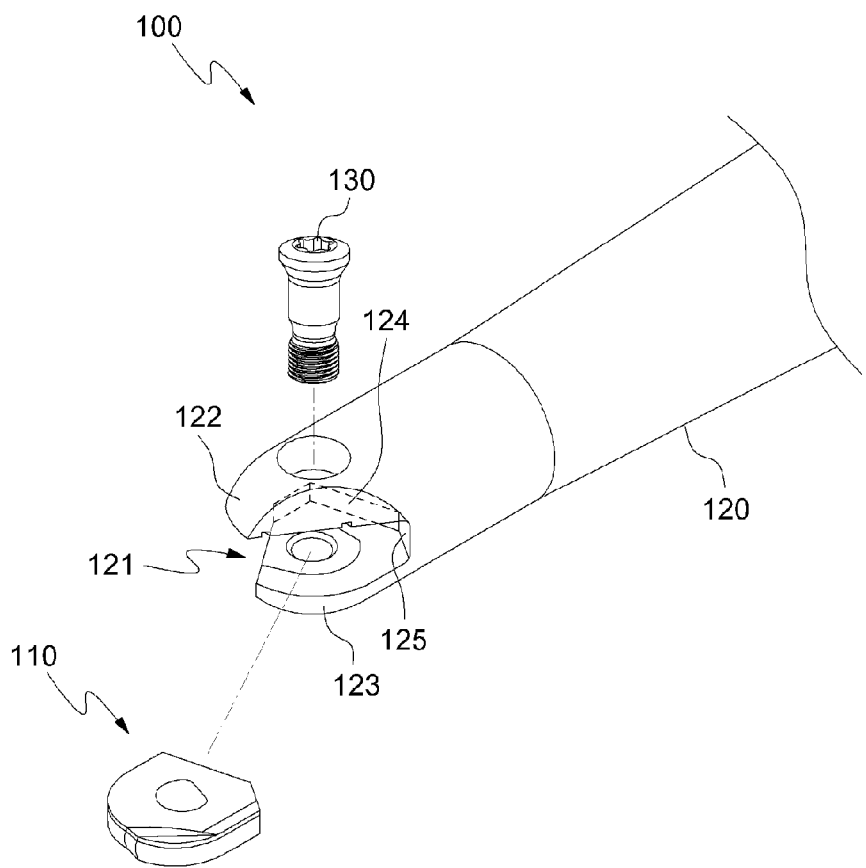
FIG. 6 is an exploded perspective view of a cutting tool according to an embodiment of the present invention.
Figure 7:
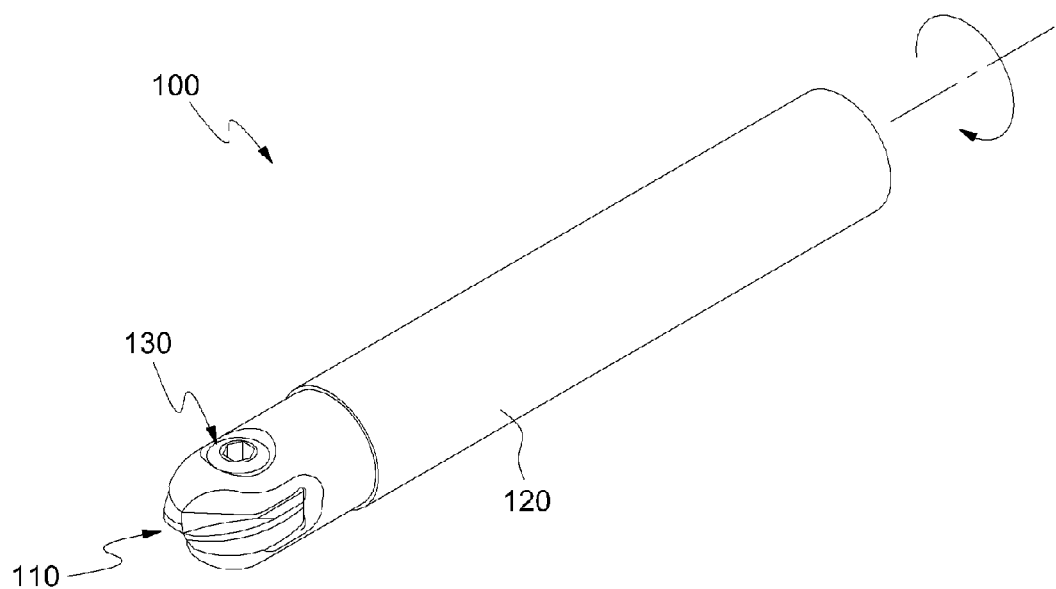
FIG. 7 is a perspective view illustrating a state of the cutting tool in which members illustrated in FIG. 4 are coupled with each other.
Figure 8:
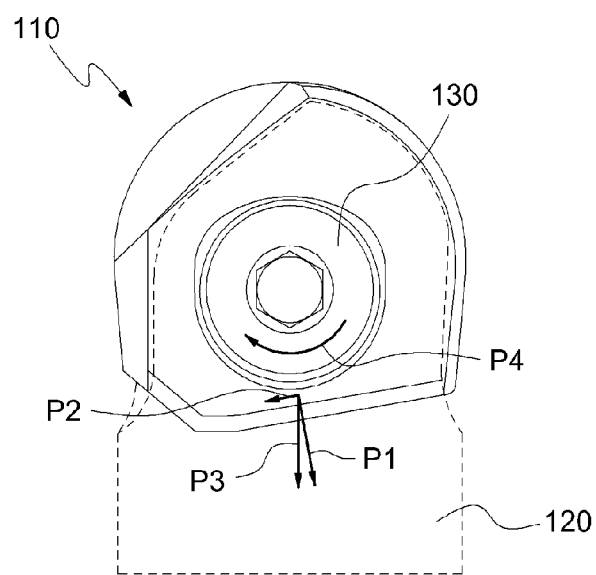
FIG. 8 illustrates axial and radial forces in the state where the members illustrated in FIG. 4 are coupled with each other.

FIG. 6 is an exploded perspective view of a cutting tool 100 according to an embodiment of the present invention, FIG. 7 is a perspective view illustrating a state of the cutting tool 100 in which members illustrated in FIG. 4 are coupled with each other, and FIG. 8 illustrates axial and radial forces in the state where the members illustrated in FIG. 4 are coupled with each other.

Methods of engaging each of the cutting inserts 10, 20, and 30 illustrated in FIGS. 1 to 5 with a holder 120 are the same, and thus a description will be made by using the cutting insert 10 according to the first embodiment of the present invention as an example for convenience of explanation. A cutting insert 110 illustrated in FIG. 6 is the same as the cutting insert 10 according to the first embodiment of the present invention.

The cutting tool 100 according to an embodiment of the present invention comprises the holder 120 in which a pocket 121 having a pair of jaws 122 and 123 at a front end portion thereof is formed, and the cutting insert 110 mounted on the pocket 121 in a replaceable manner.

The cutting insert 110 and the holder 120 may be engaged through a clamp screw 130.

The cutting insert 110 comprises a upper face and a lower face which correspond to each of jaws 122 and 123, respectively, and a front side face portion corresponding to a workpiece and a back side face portion corresponding to the pocket 121 of the holder 120, the front and back side face portions connecting the upper face and the lower face, and a through-hole passing through the upper face and the lower face.

A first contact face 124 contacting a first inclined face and a second contact face 125 contacting a second inclined face may be formed in the pocket 121 of the holder 120.

The first inclined face and the second inclined face of the cutting insert 110 form a non-symmetrical convex "V" shape, and the first contact face 124 and the second contact face 125 of the pocket 121 of the holder 120 form a non-symmetrical concave "V" shape.

When a recess for supplying a coolant is formed in the upper face and the lower face of the cutting insert 100, a coolant guide hole (not shown) may be formed in the holder 120 to supply the coolant to the pocket 121 of the holder 120.

Referring to FIG. 8, P4 represents a rotational force generated by contact between the circumferential sides of the clamp screw 130 and the inner side of the through-hole of the cutting insert 110 when the holder 120 and the cutting insert 110 are engaged through the clamp screw 130, P3 represents an axial adhesive force exerted by an elastic force of the clamp screw 130 supported by both jaws 122 and 123 from the cutting insert 110 toward the holder 120 along the axial direction when the clamp screw 130 is engaged, and P1 and P2 represent a component force exerted in a direction normal to P3 and a component force exerted in a tangential direction, respectively.

As illustrated in FIG. 8, the large normal component force P1 provides firm adhesive force between the first inclined face and the pocket 121 (the first contact face 124) of the holder 120 and the relatively small tangential component force P2 induces close adhesion between the second inclined face and the pocket 121 (the second contact face 125) of the holder 120.

When the clamp screw 130 is engaged, the rotational force P4 is exerted such that the first inclined face slides with maintaining surface-contact with the first contact face 124 of the pocket portion 121 until the second inclined face contacts the second contact face 125 of the pocket 121, thereby securing a firm and stable engaging structure even if the "V" shape of the cutting insert 110 and the "V" shape of the pocket portion 121 are not exactly identical to each other, and thus allowing a relatively large manufacturing tolerance.

Herein, a flat plane inclined in an opposite direction to the first inclined face is formed on a portion of an inner circumferential surface of the through-hole of the cutting insert 110, whereby an elastic force of the clamp screw 130 is oriented in a direction normal to the flat plane toward the second inclined face. Thus, P1 to P3 bring the cutting insert 110 into contact with the first contact face 124 in a good condition, even when the first inclined face of the cutting insert 110 slides on the first contact face 124 due to the rotational force P4 of the clamp screw 130, firm support can be guaranteed by contact between the second inclined face and the second contact face 125 of the pocket 121, thus improving firmness and stability of the engaging structure.

The first inclined face of the cutting insert 110, which is a main mounting surface, maintains stable mounting by providing resistance against the axial cutting force through surface-contact with the first contact face 124 of the holder 120, and also provides resistance against the lateral cutting force.

The second inclined face of the cutting insert 110, which is a supplementary mounting surface, resists the radial cutting force through line-contact or surface-contact with the second contact face 125 of the holder 120, and the first contact face 124 and the second contact face 125 of the holder 120 absorb the radial cutting force, thereby reducing the radial cutting force delivered to the clamp screw 130.

As such, the cutting inserts 10, 20, 30, and 110 and the holder 120 are easy to process, have large manufacturing tolerances, and prevent precision degradation caused by engagement of the cutting insert 110 with the holder 120 in a wrong direction by providing apparent orientation through the asymmetric structures. The cutting tool 100 prevents damage of the clamp screw 130 and firmly clamps the cutting insert 110 to the holder 120 by dispersing a force applied to the clamp screw 130.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

What is claimed is:

1. A cutting insert comprising:
   an upper face and a lower face;
   a front side face portion and a back side face portion, the front and back side face portions connecting the upper face and the lower face; and
   a through-hole passing through the upper face and the lower face,
   wherein a cutting edge is formed in the front side face portion, and the back side face portion is provided with a first inclined face and a second inclined face which are inclined forwardly at different angles, respectively, with respect to a plane normal to a rotational axis, and the first inclined face is longer than the second inclined face so that the back side face portion has a non-symmetrical convex "V" shape.

2. The cutting insert of claim 1, wherein the front side face portion comprises a pair of cutting edges which are rotationally symmetric to the rotational axis.

3. The cutting insert of claim 1, wherein an inclination angle of the first inclined face is smaller than that of the second inclined face.

4. The cutting insert of claim 1, wherein the first inclined face of the back side face portion is inclined at an angle of 5 to 15 degrees with respect to the plane normal to the rotational axis, and the second inclined face of the back side face portion is inclined at an angle of 35 to 45 degrees with respect to the plane normal to the rotational axis.

5. The cutting insert of claim 1, wherein a portion of an inner circumferential surface of the through-hole is a flat plane which is inclined in an opposite direction to the first inclined face.

6. The cutting insert of claim 1, wherein:
   a recess for supplying a coolant is formed in at least one of the upper face and the lower face;
   an inlet portion of the recess is formed in a boundary portion between the first inclined face and said at least one of the upper face and the lower face;
   an outlet portion of the recess is formed in a boundary portion between the cutting edge and said at least one of the upper face and the lower face; and
   an intermediate portion for connecting the inlet portion and the outlet portion is formed around the through-hole.

7. A cutting tool comprising:
   a holder having a pocket formed on a front end portion thereof, the pocket having a pair of jaws; and
   a cutting insert indexably mounted to the pocket,
   wherein the cutting insert comprises a upper face and a lower face corresponding to each of jaws, respectively, a front side face portion and a back side face portion corresponding to the pocket of the holder, the front and back side face portions connecting the upper face and the lower face, and a through-hole passing through the upper face and the lower face,
   a cutting edge is formed in the front side face portion,
   the back side face portion is provided with a first inclined face and a second inclined face which are inclined forwardly at different angles, respectively, with respect to a plane normal to a rotational axis, and
   the first inclined face is longer than the second inclined face so that the back side face portion has a non-symmetrical convex "V" shape.

8. The cutting tool of claim 7, wherein an inclination angle of the first inclined face is smaller than that of the second inclined face.

9. The cutting tool of claim 7, wherein the pocket of the holder is provided with a first contact face and a second contact face which contact the first inclined face and the second inclined face, respectively.

10. The cutting tool of claim 7, wherein the first contact face and the second contact face form a non-symmetrical concave "V" shape.

11. The cutting tool of claim 7, wherein a portion of an inner circumferential surface of the through-hole is a flat plane which is inclined in an opposite direction to the first inclined face.

12. The cutting tool of claim 7, wherein:
   a recess for supplying a coolant is formed in at least one of the upper face and the lower face;
   an inlet portion of the recess is formed in a boundary portion between the first inclined face and said at least one of the upper face and the lower face;
   an outlet portion of the recess is formed in a boundary portion between the cutting edge and said at least one of the upper face and the lower face; and
   an intermediate portion for connecting the inlet portion and the outlet portion is formed around the through-hole.

13. A cutting insert having a rotational axis (L) and comprising:
   an upper face and a lower face;
   a front side face portion and a non-symmetrical back side face portion, the front and back side face portions connecting the upper face and the lower face;
   a through-hole passing through the upper face and the lower face,
   the front side face portion being formed with at least one cutting edge; wherein:
   the back side face portion comprises a first inclined face and a second inclined face which converge in a rearward direction of the cutting insert to a point that is spaced apart by a non-zero distance (d) from the rotational axis; and
   the first inclined face is longer than the second inclined face.

14. The cutting insert of claim 13, wherein:
   the first inclined face is at least one-and-half times as long as the second inclined face.

15. The cutting insert of claim 14, wherein:
   the first inclined face and the second inclined face together extend across substantially an entire width (W) of the back side face portion, in a front view of the cutting insert.

16. The cutting insert of claim 15, wherein:
   the non-zero distance is about 25% of an entire width (W) of the back side face portion, in a front view of the cutting insert.

17. The cutting insert of claim 16, wherein:
   in a front view of the cutting insert in which the upper surface is visible, the at least one cutting edge is substantially on the same side of the rotational axis as the second inclined face.

18. The cutting insert of claim 13, wherein:
   the first inclined face and the second inclined face together extend across substantially an entire width (W) of the back side face portion, in a front view of the cutting insert.

19. The cutting insert of claim 13, wherein:
   the non-zero distance is about 25% of an entire width (W) of the back side face portion, in a front view of the cutting insert.

20. The cutting insert of claim 13, wherein:
in a front view of the cutting insert in which the upper surface is visible, the at least one cutting edge is substantially on the same side of the rotational axis as the second inclined face.

21. The cutting insert of claim 13, wherein:
an inclination angle of the first inclined face, relative to a plane that is normal to the rotational axis, is smaller than an inclination angle of the second inclined face relative to said plane.

22. The cutting insert of claim 21, wherein:
the inclination angle of the first inclined face is between 5 and 15 degrees; and
the inclination angle of the second inclined face is between 35 and 45 degrees.

23. The cutting insert of claim 13, wherein:
a portion of an inner circumferential surface of the through-hole is a flat plane which is inclined in an opposite direction to the first inclined face.

24. The cutting insert of claim 13, wherein:
a recess for supplying a coolant is formed in at least one of the upper face and the lower face;
an inlet portion of the recess is formed in a boundary portion between the first inclined face and said at least one of the upper face and the lower face;
an outlet portion of the recess is formed in a boundary portion between the cutting edge and said at least one of the upper face and the lower face; and
an intermediate portion for connecting the inlet portion and the outlet portion is formed around the through-hole.

25. A cutting tool comprising:
a holder having a pocket formed on a front end portion thereof, the pocket having a pair of jaws, a first contact face and a second contact face, the first and second contact faces converging to form a non-symmetrical concave shape in a rear portion of the pocket; and
a cutting insert retained in the pocket by a clamp screw, wherein:
the cutting insert is in accordance with the cutting insert of claim 13;
the upper and lower faces of the cutting insert engage the jaws of the pocket;
the first contact face of the pocket contacts the first inclined face of the cutting insert; and
the second contact face of the pocket contacts the second inclined face of the cutting insert.

* * * * *